United States Patent [19]
Fuehrer

[11] 4,231,455
[45] Nov. 4, 1980

[54] VEHICLE BRAKE SYSTEM WITH TRANSMISSION AND INTERNAL BRAKE

[75] Inventor: Reece R. Fuehrer, Danville, Ind.

[73] Assignee: General Motors Corporation, Detroit, Mich.

[21] Appl. No.: 944,854

[22] Filed: Sep. 22, 1978

[51] Int. Cl.² ............ F16D 67/04; B60K 41/24
[52] U.S. Cl. .................. 192/4 A; 192/12 C; 192/18 A
[58] Field of Search ........... 192/4 B, 4 A, 4 R, 12 A, 192/12 C, 18 A, 3.24, 3.25, 3.26, 3.27, 3.61

[56] References Cited

U.S. PATENT DOCUMENTS

| | | | |
|---|---|---|---|
| 2,797,780 | 7/1957 | Wemp . | |
| 2,890,769 | 6/1959 | Hause . | |
| 2,931,251 | 4/1960 | Wayman | 192/4 A |
| 3,019,670 | 2/1962 | Kelley . | |
| 3,146,630 | 9/1964 | Ivey | 192/4 B |
| 3,181,677 | 5/1965 | Fisher et al. | 192/4 B |
| 3,313,383 | 4/1967 | La Tendresse | 192/4 A |
| 3,524,523 | 8/1970 | Klimex et al. | 192/4 B |
| 3,596,537 | 8/1971 | Koivunen . | |
| 3,691,872 | 9/1972 | Schaefer et al. . | |
| 3,730,022 | 5/1973 | O'Malley . | |
| 3,747,436 | 7/1973 | Hause . | |
| 3,858,698 | 1/1975 | Hause . | |
| 3,886,820 | 6/1975 | Lentz . | |

*Primary Examiner*—George H. Krizmanich
*Attorney, Agent, or Firm*—A. M. Heiter

[57] ABSTRACT

A vehicle brake system having service brakes and a transmission with internal brakes in the transmission including an output brake and a gear reaction brake system providing friction braking of the transmission output. The transmission has planetary gearing in a housing and a first ratio fluid-operated reaction brake for braking a reaction gear for first ratio drive, and second and third ratio fluid-operated friction devices for establishing second and third ratio drives. The service brake system engages the service brakes and provides an output brake pressure increasing with brake demand to engage the output brake to brake the output shaft in all ratio drives. The first ratio reaction brake and the output brake have a common movable backing plate, so engagement of the output brakes moves the common backing plate in second and third ratio drives to engage the first ratio reaction brake in addition to the engaged second or third ratio drive friction device to provide increasing total internal braking, including friction braking by the output brake and by the gear reaction brake system, increasing with brake demand. At constant brake demand, the total internal output brake power increases with speed in a constant proportion in one arrangement, and in steps at each upshift in another arrangement.

19 Claims, 7 Drawing Figures

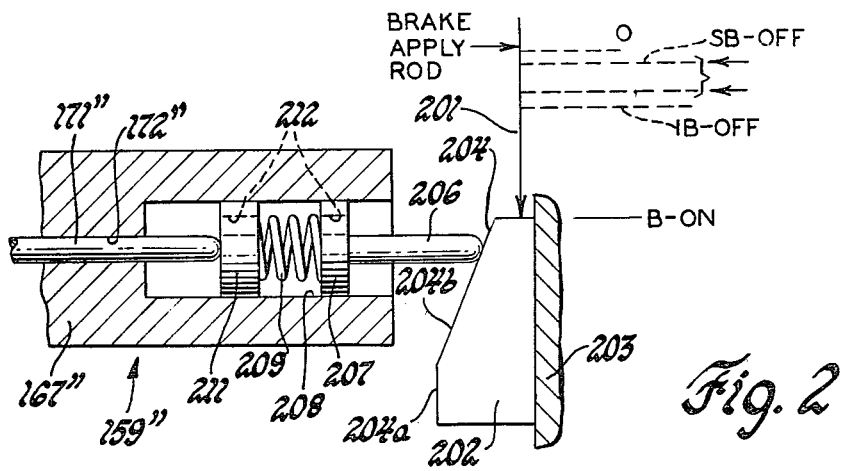
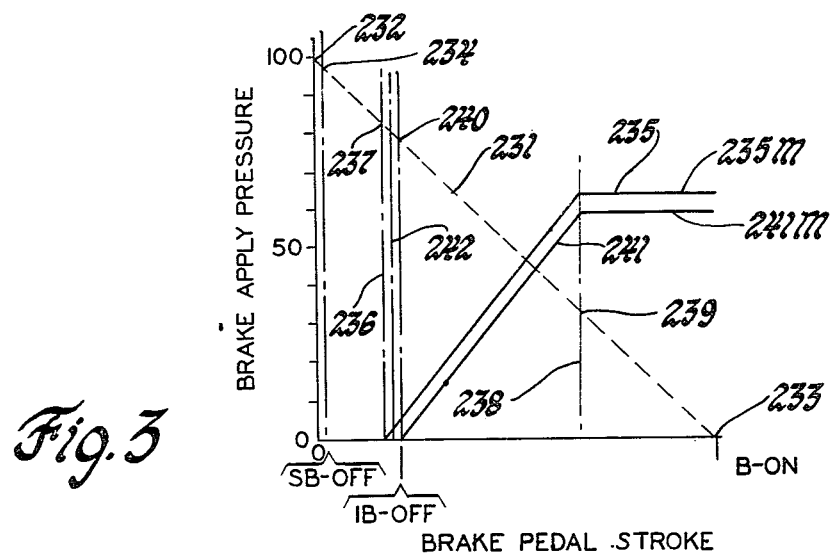
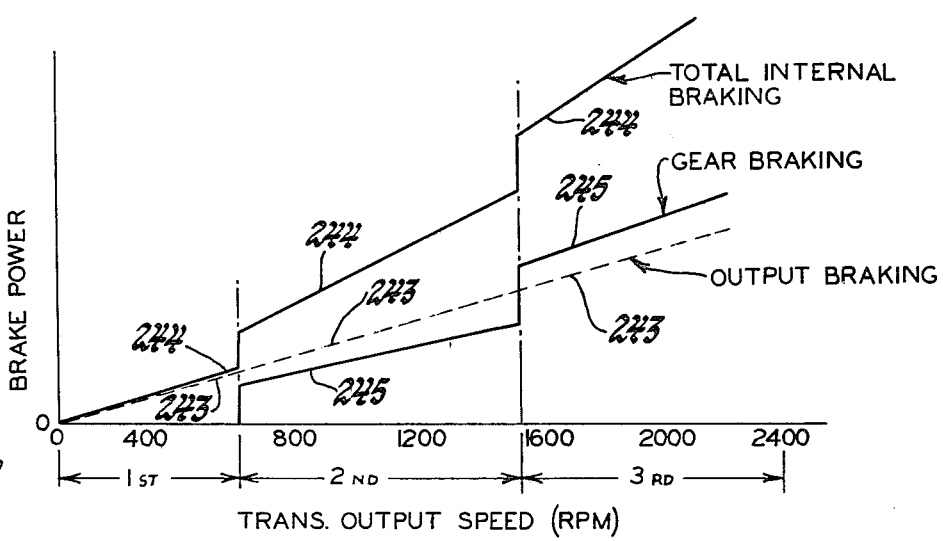

VEHICLE BRAKE SYSTEM WITH TRANSMISSION AND INTERNAL BRAKE

This invention relates to vehicle brake systems and particularly to a brake system having a transmission with an internal brake providing output friction braking and gear reaction output braking.

This invention provides an improved arrangement for transmission internal braking employing an output brake and dual-ratio engagement for gear reaction braking of the transmission output. When the transmission controls act to engage one ratio-establishing device for one ratio drive, the brake control, on brake demand, engages the output brake and a second ratio-establishing device for output and gear reaction braking. The brake control acts to engage the output brake and through the output brake to engage the second ratio-establishing device.

In all ratio drives an output brake, of the friction type located in the transmission housing, is engaged to brake the transmission output proportionally to brake demand. In first ratio drive, the first ratio device is engaged for first ratio drive and the output brake is engaged for braking. In higher ratio drives, engagement of the output brake engages the first ratio friction device to provide, in conjunction with the engaged higher ratio establishing friction device, simultaneous engagement of two ratio friction devices for output and gear reaction braking. The gear reaction braking in the planetary gearing is transmitted to the housing by a reaction brake friction device employed to establish at least one of the two engaged ratio devices.

The braking system, in response to brake demand by the operator, activates the service brakes, the output friction brake, and the gear reaction brake system. The brake demand control first provides a moderate degree of service braking and then provides output braking and gear reaction braking increasing with increasing brake demand.

The internal brakes have an output brake which is engaged by the internal brake controls in response to brake demand to provide output braking, and a gear reaction brake system, operative when a first ratio drive friction device is not engaged and another ratio device is engaged for drive by the ratio drive controls, in response to engagement of the first ratio drive friction device by the output brake to provide gear reaction braking. When the ratio drive controls engage the first ratio drive friction device, the output brake is not engaged. Engagement of the output brake acts through a one-way force-transmitting device to engage the first ratio drive friction device. The one-way force-transmitting device is provided by a common backing device for both the output brake and first ratio drive friction device, preferably a gear reaction brake which, when the brake control engages the output brake, moves the common backing device to act as an engaging device to also engage the reaction brake against the inactive ratio drive control, which acts as a backing member for both the output brake and reaction brake; and when the ratio drive control engages the reaction brake, on engagement of the reaction brake by the ratio drive control, in the absence of brake demand, the common backing device acts only as a backing device for the reaction brake and does not engage the output brake.

The transmission planetary gearing has a reaction gear member which is braked by a multiplate friction reaction brake mounted in the housing to establish first ratio drive. The output drive member is braked by a multiplate friction output brake mounted in the housing. The reaction brake and output brake are axially adjacent each other and have a common movable backing device or plate. When the transmission controls supply fluid pressure to the first ratio fluid motor to engage the first ratio friction plates, the common backing plate engages a stop on the housing preventing engagement of the output brake. When the output brake controls supply fluid pressure proportional to brake demand to the output brake fluid motor, the output brake friction plates are engaged, if the reaction brake is engaged, against the now stationary common backing plate and, if the reaction brake is not engaged, the common backing plate member is moved to engage the reaction brake against its apply fluid motor acting as the backing member for both brakes. If a higher ratio friction device is also engaged for drive in a higher ratio, the additional establishment of the first ratio friction reaction brake provides internal gear reaction braking of the output.

The brake controls provide a brake apply pressure proportional to brake demand which acts directly on the output brake and, through the output brake in higher ratios, on the first ratio brake to provide total output braking having both direct output friction braking by the output brake and gear braking by the gear reaction, increasing with brake demand. Total transmission output brake power increases with speed and has a step change on a ratio change when brake apply pressure varies constantly with brake demand. In a modification, brake apply pressure is changed in response to ratio change, so total transmission output brake power increases progressively with speed through ratio changes. During brake demand, lubricating and cooling fluid, in addition to the normal supply, is supplied to both the output brake and first ratio reaction brake in response to initial brake demand. The additional coolant fluid is supplied before the output brake is applied in response to the initial increase of output brake apply pressure, such as used for balancing the output brake retraction springs.

These and other features and advantages of the invention will be apparent from the following description and accompanying drawings of the preferred embodiments of the invention, wherein:

FIG. 2 shows a modified actuator for the internal brake controls of FIG. 1;

FIG. 3 shows brake apply pressure curves plotted against brake pedal stroke for the FIG. 1 controls;

FIG. 4 shows the brake power curves plotted against transmission output speed for the FIG. 1 controls;

The invention employs known transmission gearing and controls, such as illustrated and described in United States Patents: U.S. Pat. No. 3,886,820 Lentz, "Transmission and Control", granted June 3, 1975, which shows three-speed gearing; U.S. Pat. No. 3,730,022 O'Malley, "Power Transmission", granted May 1, 1973;

U.S. Pat. No. 3,691,872 Schaefer and Fox, "Transmission and Controls", granted Sept. 19, 1972; and U.S. Pat. No. 3,596,537 Koivunen, "Clutch Piston and Retraction Spring Subassembly and Method of Transmission Assembly", granted Aug. 3, 1971.

Figure 1:
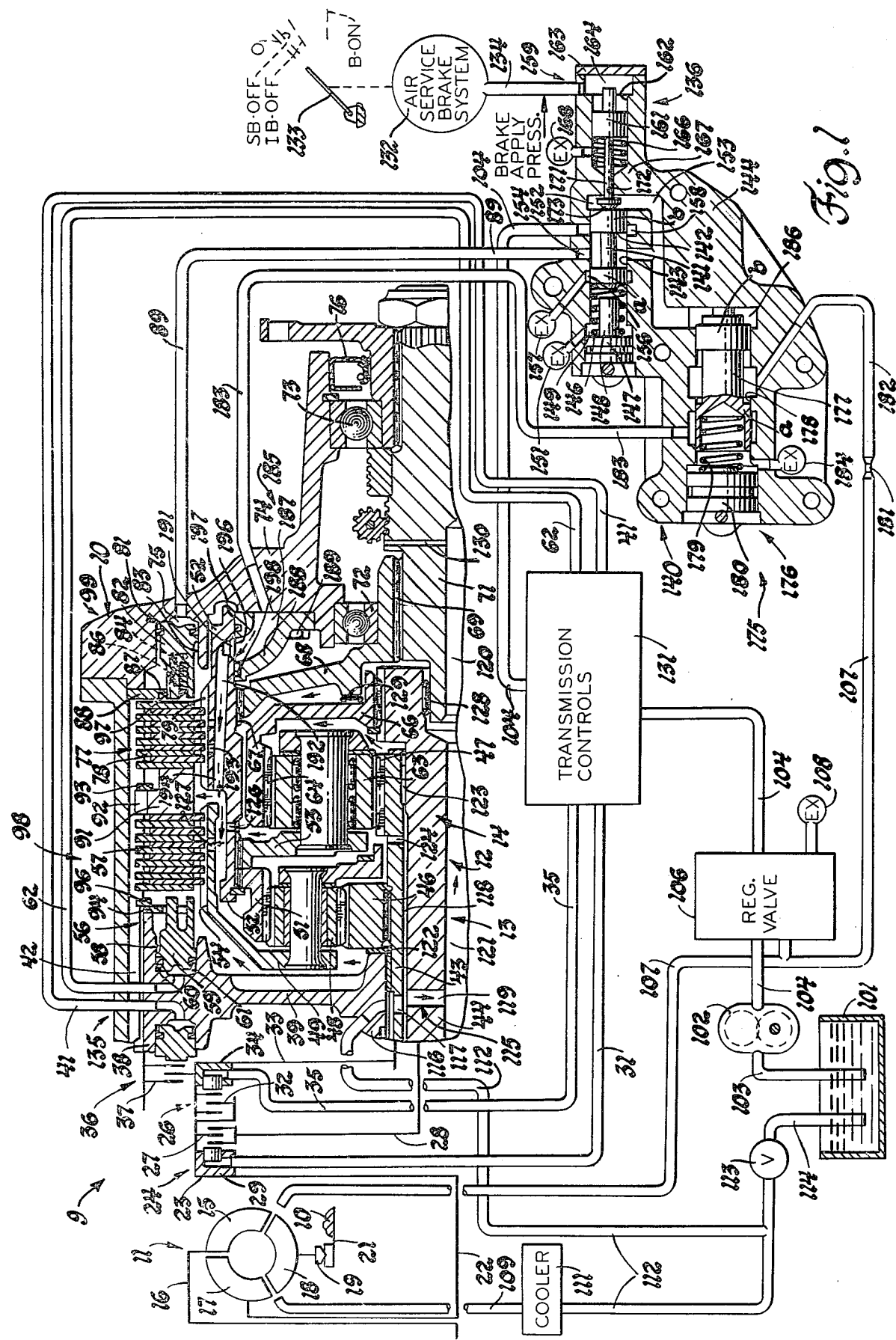
FIG. 1 is a schematic view of the vehicle brake system with the transmission having internal brakes and the controls.

Schematic FIG. 1 has a simple showing of the known portions and a more detailed showing of the new portions incorporating the internal brakes 99 and controls 140 therefor.

Referring to FIG. 1, there is shown a transmission 9 having a housing 10 which encloses a torque converter 11 and a multiratio gear transmission 12 having two planetary gearsets 13 and 14. The torque converter 11 has an impeller 15 driven by an engine (not shown) through the rotary input housing 16, a turbine 17, and a stator 18 in fluid communication with the impeller 15 and turbine 17, and connected to the transmission housing 10 via a one-way brake 19 and a sleeve shaft 21.

The torque converter 11 is of conventional construction and transmits power from the engine to the gear transmission 12. Turbine 17 is drive connected to the transmission input shaft 22 which is drive connected to the input clutch housing 23. Clutch housing 23 is drive connected to two input clutches, forward clutch 24 and third clutch 26.

Forward clutch 24 includes a plurality of spaced plates 27 which are alternately splined to clutch housing 23 and an input drum hub 28 which is drive connected to an intermediate shaft 44 rotatably supported in a sleeve shaft 43 by a central support or web 39. Clutch housing 23 has a conventional forward fluid motor 29 having a piston slidably mounted in a cylinder to provide a fluid chamber which, when pressurized by fluid supplied by forward clutch apply line 31, engages or applies forward clutch 24 to establish a drive between transmission input shaft 22 and intermediate shaft 44.

Third clutch 26 has a plurality of spaced plates 32 which are alternately splined to clutch housing 23 and to the control drum hub 33 which is drive connected to the intermediate sleeve shaft 43. Control drum hub 33 has a conventional third fluid motor 34 having a piston slidably mounted in a cylinder in control drum hub 33 to provide a fluid chamber which, when pressurized by fluid supplied by third clutch apply line 35, engages third clutch 26 to establish a drive between transmission input shaft 22 and intermediate sleeve shaft 43.

A second brake 36 is also operatively connected to the control drum hub 33 and includes a plurality of spaced plates 37 which are alternately splined to control drum hub 33 and to transmission housing 10. A conventional second fluid motor 38 has a piston slidably mounted in a cylinder in a central support or web 39 splined to transmission housing 10. The piston and cylinder provide a fluid chamber which is adapted to be filled with pressure fluid from second brake apply line 41 to engage second brake 36 to brake intermediate sleeve shaft 43.

A pair of sun gears 46 and 47 which are components of planetary gearsets 13 and 14, respectively, are fixed on intermediate sleeve shaft 43. Planetary gearset 13 has a plurality of planet pinions 48 which are rotatably mounted on its carrier 49 and mesh with sun gear 46 and ring gear 51. Ring gear 51 and the carrier 53 of planetary gearset 14 are spline drive connected to and axially fixed on the output drum 52. Carrier 49 of gearset 13 is connected to a first reaction drum 54 of first reaction brake 56 which has a plurality of spaced plates 57 which are alternately splined to first reaction drum 54 and to internal splines 42 of transmission housing 10. First fluid motor 58 has a piston 59 slidably mounted in a cylinder 60 in central web 39, and provides a fluid chamber 61 which is adapted to be filled with pressure fluid from first apply line 62 to engage first reaction brake 56. Planetary gearset 14 has a plurality of planet pinions 63 which are rotatably mounted on its carrier 53 and mesh with sun gear 47 and a ring gear 64. Ring gear 64 is drivingly connected through an input hub 66 splined to intermediate shaft 44 which is connected by input drum hub 28 to forward clutch 24.

Output drum 52 is drive connected by splines 67 to output hub 68 which is drive connected by splines 69 to output shaft 71. Output hub 68 and output shaft 71 are rotatably supported by bearings 72 and 73 in end wall 74, which is a portion of transmission housing 10, and are secured together by suitable fasteners (not shown). Housing 10 is conventionally sealed at the front end thereof by a front seal (not shown), and at its rear end by a rear seal 76 in end wall 74, so as to retain the transmission fluid or oil used for operation of the controls, lubrication, and cooling of the friction devices.

The vehicle output brake 77 has a plurality of plates 78 with alternate plates having external splines meshing with internal splines 42 on transmission housing 10, and intermediate plates with internal splines meshing with external splines 79 on output drum 52. Output brake fluid motor 81 has a piston 82 slidably mounted in a cylinder 83 in end wall 74, forming an expansible chamber 75. Retraction springs 84 in guide pockets 86 in piston 82 abut piston 82 and fingers 87 on an annular retainer plate 88 having its outer perimeter trapped between the ends of housing internal splines 42 and end wall 74 so as to secure retainer plate 88 in transmission housing 10. When output brake 77 apply pressure fluid is supplied via output brake apply line 89 to expansible chamber 75 in cylinder 83, piston 82 is moved from a brake-off position shown against the retraction springs 84 to engage plates 78 against a common backing plate 91. Common backing plate 91 has external splines 92 meshing with internal splines 42 on housing 10 to prevent rotation of common backing plate 91 and to permit apply movement away from a stop ring 93, which is secured on housing 10, toward plates 57 of first reaction brake 56. Continued movement of piston 82, plates 78, and common backing plate 91 engages first reaction brake plates 57 against piston 59, which bottoms-out in cylinder 60 or abuts the bottom of cylinder 60, to function as a reaction member so that both output brake 77 and first reaction brake 56 are engaged. When pressure fluid is supplied by first apply line 62 to engage first reaction brake 56, piston 59 moves to engage common backing plate 91 which engages stop ring 93, which is secured on housing 10, so common backing plate 91 cannot move to engage output brake plates 78, and thus output brake 77 remains in brake-off position when output brake chamber 75 is exhausted by output brake apply line 89.

Forward clutch 24 and third clutch 26 are conventional and, as schematically shown in FIG. 1, clutch housing 23 provides the backing plate for both clutches which have retraction springs (not shown). These clutches 24 and 26 may have construction details as shown in the above U.S. Pat. No. 3,596,537 Koivunen, or above U.S. Pat. No. 3,730,022 O'Malley. The first and second brakes 56 and 36 and their respective fluid motors 58 and 38 have retraction springs (not shown) retained by a retainer plate secured by a snap ring. The retainer plate 94 and snap ring 96 retain the retraction springs in first fluid motor 58, and a similar retainer plate and snap ring (not shown) are preferably used to retain the retraction springs of second fluid motor 38 and to secure web 39 axially to housing 10. The above and related details of the first and second brakes 56 and 36 may be constructed as shown and described in the above U.S. Pat. No. 3,730,022 O'Malley, or above U.S. Pat. No. 3,596,537 Koivunen, the latter being the preferred construction. In the new construction described herein, first brake 56 and output brake 77 have common backing plate 91 for their independent and joint operation. The output brake fluid motor 81 may have a friction disc fastener-and-post arrangement 97 to secure retainer plate 88 to piston 82, compressing and/or holding retraction springs 84 as a subassembly during transmission assembly, as shown in the above U.S. Pat. No. 3,596,537 Koivunen. Retainer plate 88 has a recess formed therein for the friction disc fastener of fastener-and-post arrangement 97 to reduce the axial space required. The first and second fluid motors 58 and 38 also may have this subassembly feature.

The gear reaction brake system 98 includes the gear transmission 12, especially first reaction brake 56, and output brake 77 which applies first reaction brake 56 in second and third ratios for gear reaction braking. The gear reaction brake system 98 and the output brake 77 provide the internal brakes 99.

CONTROLS

Transmission housing 10 has a sump 101 receiving fluid used in the transmission lubrication and cooling system 115 and brake cooling system 175 and exhausted from the transmission control system 131 and internal brake control 140. A pump 102, conventionally driven by rotary input housing 16, has an intake line 103 connected to a sump 101 and delivers fluid to mainline 104 at a fluid pressure regulated by a regulator valve 106. Conventional regulator valve 106 may be like main pressure regulator valve (119) shown in the above U.S. Pat. No. 3,691,872 Schaefer et al, and regulates mainline pressure at a predetermined high value (e.g., 100 psi or higher), and delivers first overage to converter supply line 107 and second overage to exhaust 108. Converter supply line 107 is connected to supply and fill torque converter 11 and to circulate fluid through the torque converter to the converter outlet line 109, and then through a cooler 111 to lubrication line 112. The lubricant fluid pressure in lubrication line 112, created by the downstream restriction of the lubrication system, is regulated at a low pressure value (e.g., 30 psi), by the relief valve 113 which connects excess fluid to exhaust 114.

Lubrication line 112 is connected to the transmission lubrication and cooling system 115 now described through central web 39 to supply lubricant to the web bearing 116 supporting intermediate sleeve shaft 43, through a first aperture 117 in intermediate sleeve shaft 43, to the annular space 118 between intermediate sleeve shaft 43 and intermediate shaft 44, and through an aperture 119 in intermediate shaft 44 to bore 121 therein. Fluid flow in web bearing 116, space 118, and bore 121, in a forward axial direction is used in a conventional manner (not shown) to lubricate the forward and third clutches 24 and 26; and in a rearward axial direction, flows as indicated by solid line arrows (FIG. 1) and described below. Rearward axial flow in web bearing 116 sequentially lubricates web bearing 116, thrust bearing 122 between central web 39 and sun gear 46 of gearset 13, the gearsets 13 and 14, and first reaction brake 56. Rearward axial flow in space 118 sequentially lubricates the bearings 123 between intermediate sleeve shaft 43 and shaft 44, passes through a second aperture 124 in intermediate sleeve shaft 43 radially outwardly through the gearsets 13 and 14, through an aperture 126 in output drum 52 and aperture 127 in first reaction brake drum 54, to lubricate and cool first brake plates 57; and also flows between first reaction drum 54 and output drum 52 to lubricate and cool output brake plates 78. Rearward axial flow in bore 121 in intermediate shaft 44 passes through and lubricates bearing 128 rotatably supporting intermediate shaft 44 on output shaft 71, and thrust bearing 129 between input and output hubs 66 and 68, and flows radially outwardly through aperture 126 in output drum 52 to supplement the above-described lubricant flow through aperture 126 to first brake plates 57 and output brake plates 78. The above apertures 126 and 127 are preferably an annular series of apertures. Lubricant flows from bore 121 in intermediate shaft 44 to bore 120 in output shaft 71, and through aperture 130 in output shaft 71 to lubricate bearings 72 and 73 supporting output hub 68 and shaft 71 in housing end wall 74.

The known transmission controls 131 are supplied by mainline 104 and supply apply lines (indicated by "X" in the Table), to engage their respective clutch or brake to establish the ratio drives, as shown in the following TABLE I:

TABLE I

| Ratio Drive | Forward Clutch 24 Appl.Line 31 | Third Clutch 26 Appl.Line 35 | Second Brake 36 Appl.Line 41 | First Brake 56 Appl.Line 62 |
|---|---|---|---|---|
| 1st | X | | | X |
| 2nd | X | | X | |
| 3rd | X | X | | |
| Rev. | | X | | X |

The other apply lines are exhausted by transmission controls 131 to exhaust their respective fluid motors and permit the conventional retraction springs to disengage the other clutch or brakes. The transmission controls 131 may be known automatic controls, such as the type shown in the above U.S. Pat. Nos. 3,886,820 Lentz, 3,691,872 Schaefer et al, or manual controls.

In all forward drives, forward clutch 24 is engaged to drive intermediate shaft 44 and ring gear 64 of planetary gearset 14. In 1st ratio, first brake is engaged to hold carrier 49 of gearset 13 to provide a compound reduction drive in both planetary gearsets 13 and 14 to output drum 52 and output shaft 71. In 2nd ratio, second brake 36 is engaged to hold intermediate sleeve shaft 43 and sun gear 47 for reduction drive in gearset 14, to carrier 53, output drum 52 and output shaft 71. In 3rd ratio, third clutch 26 is engaged to drive intermediate sleeve shaft 43 which, with intermediate shaft 44 driven by forward clutch 24, provides lock-up or 1-to-1 drive. The above first and second brakes 56 and 36 are reaction brakes. First and second brakes 56 and 36, third clutch 26 and forward clutch 24 are ratio-establishing devices 135. Fluid pressure is supplied to forward motor or actuator means 29 to engage forward clutch 24, and selectively to one of the first, second, or third fluid motors or actuator means, 58, 38, or 34, to respectively engage first or second brakes 56 or 36, or third clutch 26, to establish 1st, 2nd, and 3rd forward ratio drives.

Reverse drive is established by engaging third clutch 26 and first brake 56 to drive intermediate sleeve shaft 43 and sun gear 46 of gearset 13 and hold carrier 49 for reverse drive to output drum 52 and output shaft 71.

This transmission 9 is used in a vehicle having a conventional fluid pressure service brake system 132 (FIG. 1) of the spring-applied air-released type having controls and vehicle service brakes. The operator moves brake demand pedal 133 for increasing brake demand from the zero stroke position (0, FIG. 1), through intermediate positions described below, to the both brakes full-on position (B-ON) to provide air brake pressure, the brake pressure signal (Curve 231, FIG. 3) which substantially immediately after, or at zero stroke position (0), has a maximum value (point 232) and begins to continuously decrease to a minimum value (point 233) with increasing brake demand and is inversely proportional to brake demand. The decreasing brake pressure signal acts in the service brake system 132 to provide increasing brake torque by the spring-applied service brakes. As pedal 133 is moved for increasing brake demand from zero stroke position (0) to service brake-off position (SB-OFF), the brake pressure signal is reduced by a small amount (point 234) to take up slack in the service brakes; and on continued pedal movement from service brake-off position (SB-OFF) through internal brake-off position (IB-OFF) to both brakes full-on position (B-ON) to decrease the brake pressure to a minimum (or zero) for full service brake apply. The brake pressure signal is connected by brake signal line 134 to control internal brake control 140 for controlling internal brakes 99, which has output brake 77 for friction braking of output shaft 71, and through common backing member 91, acting as an actuator means for first reaction brake 56 of gear transmission 12, operates the gear reaction system 98 for providing gear reaction braking of the output shaft 71.

The internal brake control 140 has a brake pressure regulator valve 136, an actuator 159 and a brake coolant valve 176. Brake pressure regulator valve 136 is an inverting-type regulator valve which provides an output brake gross apply fluid pressure (Curve 235, FIG. 3) inversely proportional to the air pressure signal in line 134 and directly proportional to brake demand, to output brake line 89 connected to cylinder 83 of output brake fluid motor 81, to apply output brake 77 with a net apply pressure (Curve 241, FIG. 3), which is the gross apply pressure minus the retraction spring force equivalent pressure.

Brake pressure regulator valve 136 has a valve element 141 having equal diameter lands a and b, and a central groove 142 between the lands. Valve element 141 is slidably mounted in a bore 143 in valve body 144. A biasing spring 146 is located in a chamber 149, seated on a plug 147, guided by guide-and-valve stop member 148, and engages the end of land 141a to bias valve element 141 to increase output brake apply fluid pressure in output brake line 89. Plug 147 may also seal spring chamber 149 at this open end of bore 143, requiring exhaust 151 to vent spring chamber 149. At the opposite closed end of bore 143 there is a pressure chamber 152 connected by branchline 153 of output brake apply line 89, so gross brake apply pressure in chamber 152 acts on the end area of land 141b to bias valve element 141 in an output brake apply pressure decreasing direction. Output brake apply line 89 and its branchline 153 are connected to the central brake apply port 154 located centrally of groove 142 when valve element 141 is in the regulating position and always open to groove 142. The exhaust port 156, connected to exhaust 157, is on the spring chamber 149 side of central brake apply port 154; and mainline port 158, connected to mainline 104, is on the pressure chamber 152 side of central port 154. Exhaust and mainline ports 156 and 158 are spaced apart about the length of central groove 142 so that lands 141a and b may have a small underlap or overlap relative to these ports.

Internal brake control actuator 159 has a piston 161 in a bore 162 having an end closure 163 closing the outer end of bore 162 and forming air pressure chamber 164 connected to brake signal line 134. On the other side of piston 161, a spring 166 is located in the portion of bore 162 between piston 161 and wall 167 of valve body 144 between bores 162 and 143. This portion of bore 162 is vented by exhaust 168. A strut 171 is slidably mounted in a guide bore 172 in wall 167 to transmit force between actuator piston 161 and regulator valve element 141. Strut 171 has a head 173 having clearance with wall 167 when valve element 141 is in the pressure increasing position shown (FIG. 1), supplying mainline pressure fluid to output brake apply line 89. In the brake pressure regulator valve 136, the valve element 141 is biased in a pressure-decreasing direction by the actuator force acting through strut 171 and varying directly proportionally to the brake pressure signal supplied by brake signal line 134, and by gross brake apply pressure in pressure chamber 152 acting on the end area of land 141b; and is biased in an opposite pressure-increasing direction by biasing spring 146 acting directly on valve element 141, and by actuator spring 166 acting directly on actuator piston 161 to regulate gross brake apply pressure (Curve 235, FIG. 3), in brake apply line 89 inversely proportional to the brake pressure signal (curve 231), and directly proportional to brake demand from a minimum or zero value to a maximum value. Biasing spring 146 determines the maximum gross brake apply pressure. Biasing spring 146 plus actuator spring 166 determine the relation between the brake pressure signal and gross brake apply pressure to provide zero gross brake apply pressure during a small initial range of decreasing brake pressure signal and then increasing gross brake apply pressure to the maximum value during a large central range of decreasing brake pressure signal.

The brake cooling system 175 has a brake coolant valve 176 and brake coolant feed system 185. The brake coolant valve 176 has a valve element 177 having equal diameter lands a and b in a bore 178, and a spring 179 abutting a plug 180 fixed in bore 178 and biasing valve element 177 to the closed position shown (FIG. 1). Converter supply line 107 is connected through a restriction 181 to the brake coolant supply line 182 which is blocked between lands 177a and b when brake coolant valve 176 is closed. Brake coolant feed line 183 also is blocked by land 177a. The portion of bore 178 in which spring 179 is located is vented by an exhaust 184. Output brake apply line 89 is connected by its branchline 153 to a chamber 186 at the other end of bore 178 to act on land 177b to move valve element 177 from the closed position at a low gross brake apply pressure—less than the pressure required to move output brake piston 82 against retraction springs 84—to connect brake coolant supply line 182 to brake coolant feed line 83 prior to the initial application of output brake 77. In the brake coolant feed system 185, brake coolant feed line 183 is connected through end wall 74 of housing 10 to a transfer port 187 in an annular transfer member 188 secured and sealed by fasteners 189 to end wall 74. Transfer port 187 preferably is square or rectangular (but may be round) in cross section throughout its quarter-circle length, and extends from the radial surface of annular transfer member 188, in sealing engagement with end wall 74, to a small peripherally and axially extending portion of the external cylindrical surface 197 of annular transfer member 188. An annular transfer groove 191 is located in the internal cylindrical surface 196 of output drum 52, facing transfer port 187 and external cylindrical surface 197 of transfer member 188. A plurality (e.g., 12) of axial passages 192 in output drum 52 are equally spaced around the circumference, one passage 192 being shown in the sectional view of FIG. 1. Each of the passages 192 is connected to annular transfer groove 191 and by apertures 193 through to the outer diameter of output drum 52 to lubricate plates 78 of output brake 77. Each passage 192 has an axial outlet 194 which may be restricted to apportion coolant flow between output brake plates 78 and first brake plates 57, and provides a jet stream of lubricating fluid directed within the first reaction drum 54 to also lubricate and cool first brake plates 57. The portions of internal complete cylindrical surface 196 of output drum 52 on opposite sides of the annular transfer groove 191 face the external complete cylindrical surface 197 of transfer member 188 on opposite sides of transfer port 187. An annular seal 198 on external cylindrical surface 197 of transfer member 188 is located on each side of transfer port 187 and annular transfer groove 191 to provide a sealed transfer interface between transfer member 188 and output drum 52. This brake coolant feed transfer means provides coolant flow from coolant feed line 183 through transfer port 187, transfer groove 191, passages 192 and apertures 193, to output brake plates 78, and further through axial outlets 194 to first brake plates 57 without time delay, so brake cooling begins just before or with brake apply.

OPERATION

When the input rotary housing 16 is driven, the pump 102 is driven and supplies fluid from the sump 101 to mainline 104. Main regulator valve 106 regulates mainline pressure at a high pressure value and connects first overage fluid flow to converter supply line 107 to supply torque converter 11 for torque converter drive operation and coolant flow through torque converter 11, converter outlet line 109 and cooler 111 to lubrication line 112, for the transmission lubrication and cooling system 115. The lubricant fluid pressure is regulated or limited to a lower pressure value by relief valve 113 and connected by lubrication line 112 through central web 39 to web bearing 116, the annular space 118 between intermediate sleeve shaft 43 and intermediate shaft 44, and through the aperture 119 to bore 121 in intermediate shaft 44 for forward axial flow to conventionally lubricate and cool forward and third clutches 24 and 26, and second brake 36; and for rearward axial flow to lubricate the gearsets 13 and 14, bearings, first brake 56, and output brake 77, as described above, to provide the normal lubrication and cooling during drive, engine drive and overrun drive, operation in the ratio drives. This normal drive operation lubrication is sufficient for normal ratio drive, coast, and ratio change operation and lubrication of output brake plates 78 when free-running or disengaged.

The transmission controls 131, either manually or automatically operated, function to supply mainline pressure to forward clutch apply line 31 to engage forward clutch 24 in all forward ratio drives; and selectively to first apply line 62 to engage first brake 56; to second apply line 41 to engage second brake 36; and to third apply line 35 to engage third clutch 26, to respectively provide forward 1st, 2nd, and 3rd ratio drives. The controls 131 are manually operated to connect mainline 104 to third apply line 35 and first apply line 62 to engage third clutch 26 and first brake 56 for reverse drive. In each drive, the apply lines that are not supplied are exhausted, so the retraction springs disengage the exhausted clutch or brakes.

The transmission internal brake system, having internal brakes 99 and internal brake control 140, is operated in response to the vehicle air brake system 132 which includes controls, vehicle service brakes, and brake pedal 133. This air brake system 132 is of a conventional type having spring-engaged and air pressure-released service brakes in which the brake pedal 133, on movement from zero stroke position (0, FIGS. 1 and 3), to both brakes full-on position (B-ON), the full brake pedal stroke for increasing brake demand, actuates the controls of brake system 132 (normally a regulator valve) to reduce vehicle service brake air pressure or brake pressure signal (curve 231, FIG. 3) from a maximum pressure value (point 232), e.g., 100 psi, to a minimum pressure value (point 233), normally zero. The service brake take-up stroke of brake pedal 133 is small and extends from zero stroke position (0, FIG. 3), to service brake-off position (SB-OFF), at which a small reduction of brake air pressure (from point 232 to point 233) provides initial contact engagement of the service brakes. Then, with continued brake pedal stroke from service brake-off position (SB-OFF) to both brakes full-on position (B-ON) for increasing brake demand, the brake air pressure signal (Curve 231) decreases and service brake torque proportionally increases from a minimum to a maximum.

The brake pressure signal is connected by brake signal line 134 to pressure chamber 164 of actuator 159 to control the brake pressure regulator valve 136 of internal brake control 140 to provide in the output brake apply line 89 gross brake apply pressure (Curve 235) inversely proportional to the brake pressure signal and directly proportional to brake demand, from zero to a maximum value, to apply output brake 77. Since in the complete vehicle brake system the air service brake system 132 is the primary brake system and the transmission or internal brakes or brake system 99 is the secondary system, the internal brake control 140, the actuator 159 and brake regulator valve 136, provide a lag or delay period between the initial application of the service brakes of air service brake system 132; and, after such delay period, initially engage the transmission internal output brakes or brake system 99. During movement of brake pedal 133 from zero stroke position (0), through service brake-off stroke position (SB-OFF), to the initial gross brake pressure stroke position (236), the decreasing brake pressure signal (Curve 231 to lower point 237) provides a force on strut 171 overcoming the bias force of actuator spring 166 and biasing spring 146, so brake pressure regulator valve 136 provides zero gross brake apply pressure (Curve 235). Continuing movement of brake pedal 133 from the initial gross brake pressure stroke position (236) to a higher brake apply stroke position (238) decreases the brake pressure signal to a low value (point 239), and brake pressure regulator valve 136 provides inversely proportionally increasing gross brake apply pressure (Curve 235) from zero to a maximum value (235M) determined by the bias force of biasing spring 146. During further movement of brake pedal 133 to the brakes full-on position (B-ON), gross brake apply pressure (Curve 235) is constant at the maximum value (235M). As brake pedal 133 moves from the initial gross brake pressure stroke position (236) to the initial net brake pressure position, or internal brake-off position (IB-OFF), brake signal pressure further decreases to a lower value (point 240) and the gross brake apply pressure (Curve 235) increases a small amount sufficient to overcome the force exerted by retraction springs 84 of output brake 77 for contact engagement of output brake 77. Continued movement of brake pedal 133 from the initial net brake pressure stroke position (IB-OFF) to a higher brake apply stroke position (238) increases the net brake apply pressure (Curve 241) from (0) to a maximum value (241M) and, with continued stroke to brakes full-on position (B-ON), remains constant at its maximum value. The net brake apply pressure is equal to the gross brake apply pressure, minus the equivalent pressure required to overcome the force of retraction springs 84. The torque of output brake 77 begins with the stroke of brake pedal 133 in the initial net brake pressure position (IB-OFF) and increases proportionally to net brake apply pressure (Curve 241) to the maximum value (241M).

These operating characteristics provide a delay period delaying the application of output brake 77 relative to brake demand movement of pedal 133 from zero stroke position (0) to the initial net brake pressure position (IB-OFF), and relative to service brake application from service brake-off position (SB-OFF) to the initial net brake pressure position or internal brake-off position (IB-OFF), so the service brakes are applied to a moderate degree (e.g., 20%) before the output brake 77 is applied to apply internal brakes 99. Then, with further movement of brake pedal 133 to the brakes full-on position (B-ON), the air brake pressure signal in line 134 decreases, and the net output brake brake apply pressure (Curve 241) in apply line 89 increases to a maximum (Curve 241M). The brake torque of output brake 77 is proportional to net output brake apply pressure. The service brakes of service brake system 132 and the output brake 77, in all ratios, provide increased brake torque in proportion to increasing brake demand, to a high brake demand stroke position (238). Then service brake torque continues to increase to brakes full-on position (B-ON) of brake pedal 133, and output brake torque remains at the maximum value. Gear reaction brake torque is proportional to net output brake apply pressure and also increases with increasing speed ratio, as described below.

During the portion of the delay period when the brake pedal 133 moves from the initial gross brake pressure stroke position (236) to the initial net brake pressure position (IB-OFF), and the internal brake apply pressure is increasing to balance the force of retraction springs 84 of output brake 77, at the coolant signal stroke position (242) of brake pedal 133, the brake apply pressure in output brake apply branchline 153 acts in chamber 186 to open brake coolant valve 176 to connect converter supply line 107, through restriction 181 to brake coolant supply line 182 to brake coolant feed line 183, to supply lubricant to output brake plates 78 and first reaction brake plates 57. The annular transfer member 188 provides for transfer of coolant under pressure, and without accumulation or storage for prompt feed, from coolant feed line 183 in stationary end wall 74 of housing 10 to rotating output drum 52.

When the transmission 9 is operating in 1st ratio drive, forward apply line 31 is supplied to engage forward clutch 24 and 1st ratio apply pressure, supplied by first apply line 62 to chamber 61 in cylinder 60 of first fluid motor 58, moves piston 59 to engage first brake plates 57 against common backing plate 91, which is stopped by stop ring 93 before it engages output brake plates 78. Then in response to brake demand, gross output brake pressure supply by brake pressure regulator valve 136 through output brake apply line 89 to cylinder 83, moves piston 82 to overcome the retraction springs 84 and engage plates 78 against common backing plate 91 to engage output brake 77 for friction braking of output drum 52 and output shaft 71. The maximum gross brake apply pressure supplied to output brake 77 preferably is less than mainline pressure, but may be mainline pressure, the same as first brake 56 pressure. Even when the areas of output brake and first brake fluid motors 81 and 58 are the same, the common backing plate 91 will not move. In 1st ratio drive, as net brake apply pressure increases from zero to the maximum value, output brake 77 provides brake torque increasing from zero to a maximum value, and output braking power increasing with torque and at maximum brake torque, provides maximum braking power (Curve 243, FIG. 4), increasing with speed from zero to a maximum at the highest speed used in 1st ratio. This is the maximum total internal braking power (Curve 244) in 1st ratio as there is no gear reaction braking because only the forward clutch 24 and first brake 56 are engaged and the other ratio devices—second brake 36 and third clutch 26—are disengaged. The total internal braking power (Curve 244) is the sum of the output braking power (Curve 243) and the gear braking power (Curve 245), excluding parasitic losses and engine braking in all ratio drives.

When the transmission 9 is operating in 2nd ratio drive, forward clutch 24 is engaged and second apply line 41 is supplied with fluid to engage second brake 36 and the other ratio apply lines, 1st ratio 62 and 3rd ratio 35, are exhausted to disengage first brake 56 and third clutch 26. On engagement of the vehicle service brakes of the service brake system 132 providing net brake apply pressure to output brake apply line 89, output brake 77 is applied, after the delay period, with a force proportional to brake demand to a maximum. The brake apply pressure in cylinder 83 moves piston 82 to engage output brake plates 78 against common backing plate 91 and to axially move plates 78 and backing plate 91 to engage first brake plates 57 against first piston 59 which bottoms out in cylinder 61 to act as a reaction member during this phase of operation. This engagement of output brake 77 provides the same output brake torque as in 1st ratio drive and, at maximum net brake apply pressure and brake torque, provides the maximum output braking power (Curve 243) increasing with speed in the 2nd ratio speed range. Engagement of first brake 56, together with previously engaged second brake 36, provides gear reaction braking power in 2nd ratio drive (Curve 245, FIG. 4). The sum of output braking power (Curve 243) plus gear braking power, both on output shaft 71, is the total internal braking power (Curve 244), as in 1st ratio.

When the transmission 9 is operating in 3rd ratio drive, 3rd ratio apply pressure is supplied to third apply line 35 to engage third clutch 26, and 1st and 2nd ratio apply lines 62 and 41 are exhausted, so first and second brakes 56 and 36 are disengaged. Forward clutch 24 remains engaged. When the brakes of vehicle service brake system 132 are applied after the delay period, output brake 77 and first brake 56 are applied in the same manner as in 2nd ratio drive described above. Output brake 77 provides output braking and the simultaneous engagement of forward clutch 24, 3rd ratio clutch 26, and 1st ratio brake 56 provides reaction gear braking to provide high power internal braking in 3rd ratio drive. As shown by output braking power Curve 243 in FIG. 4, in the 3rd ratio for maximum net brake apply pressure, the output brake torque is the same as in 1st and 2nd ratio drives and the output braking power of output brake 77 increases at a higher level with output speed. The braking power of the reaction gear braking (Curve 245) increases in 2nd and 3rd ratio drives with increasing output speed. The reaction gear braking power on output shaft 71 provided by the same torque capacity engagement of first brake 56 in 3rd ratio drive is higher than in 2nd ratio drive because the brake torque ratio between reaction drum 54 and output shaft 71 (output shaft torque divided by reaction drum torque) is higher in 3rd ratio than in 2nd ratio, so a higher proportion of brake torque provided by the braking operation of the 1st ratio brake 56 is effective on the output shaft 71 in 3rd ratio than in 2nd ratio. In this gearing in 3rd ratio drive, engagement of forward clutch 24 and third clutch 26 locks up the gearing, so this brake torque ratio is 1:1; while in 2nd ratio drive, engagement of forward clutch 24 and second brake 36 provides a lower brake torque ratio. Thus, gear braking provides a stepped increase of braking torque and power with increased transmission speed ratio. Since the brake apply pressure engages the output brake 77 and, through the movable common backing plate 91 engages the first brake 56 against piston 59 acting as a common backing member for reaction gear braking in 2nd and 3rd ratio drives, this mechanical arrangement provides a simultaneous application of output brake 77 and the gear reaction brake system 98 for a smooth increase of total brake torque of internal brakes 99 proportional to one brake apply pressure supplied to the one output brake fluid motor 81.

During braking operation, the slip occurs in output brake 77 and 1st ratio brake 56, so these brakes are supplied with additional lubricant during braking. The other ratio establishing devices—forward clutch 24, second brake 36, and third clutch 26—have normal slip for smooth shifting but do not slip as a result of braking since maximum brake pressure is less than mainline pressure. As shown in FIG. 4, the gear braking power increases on a stepped curve (Curve 245) with increasing speed, so the total internal braking power (Curve 244) increases at a higher rate than output braking power (Curve 243) relative to speed. FIG. 4 shows the maximum brake demand braking power curves. At lower brake demand on net brake apply pressures, braking power is proportionally reduced. This internal braking system provides supplemental braking to normal engine braking and normal service braking of a vehicle. Braking in reverse ratio is the same as in 1st ratio forward drive.

ACTUATOR MODIFICATION

A modified actuator 159″ (FIG. 2) may be used to control the brake pressure regulator valve 136 in the arrangement of transmission 9, service brake system 132, output brake 77, and internal brake control 140 shown in FIG. 1 and described above. The strut 171″ in guide bore 172″ in wall 167″ is like the arrangement of FIG. 1, so like reference numerals (double-primed) are used. The service brake system 132 has a pedal 133 (FIG. 1) which actuates a brake apply rod 201, which moves in the direction indicated by the arrow from the zero stroke position (0) to the brakes full-on position (B-ON) shown for increasing brake demand, and is connected to similarly move a cam 202 mounted on a guide 203 for straight-line movement. Cam 202 has a cam surface 204, having a constant height portion 204a and a sloped portion 204b, engaging a cam follower 206 fixed on a guide piston 207 slidably mounted in a bore 208. Guide piston 207 engages a spring 209 which engages a thrust piston 211 (both in bore 208), transferring the bias force of spring 209 to strut 171″. Guide piston 207 and thrust piston 211 have apertures 212 therein, or clearance in bore 208, or bore 208 has vents (not shown) formed therein to prevent entrapped fluid resisting movement of the actuator 159″. Cam 202, in the zero stroke position (0) shown, has a maximum height and acts on spring 209, through cam follower 206 and guide piston 207, to apply a maximum bias force through thrust piston 211 to strut 171″. With increasing brake demand, rod 201 and cam 202 move to brakes full-on position (B-ON), progressively decreasing the height of cam 204 on its sloped portion 204b to decrease the bias force applied by spring 209 to strut 171″. The force on strut 171″ decreases in the same relation to brake demand and the pedal-responsive stroke of rod 201, at the same intermediate positions as the force on strut 171 of FIG. 1 decreases in relation to air signal pressure and the stroke of pedal 133 (FIG. 1), to provide the same brake apply pressures as shown by the curves of FIG. 3 and described above. Thus the FIG. 2 modification, when used in the vehicle brake system of FIG. 1, will provide the above-described operation. Cam follower 206 may be on the constant-height cam portion 204a between zero stroke position (0) and the initial gross brake pressure stroke position (236, FIG. 3). A directly proportional pressure regulator valve may be used with a cam providing cam height increasing with increasing brake demand. With air or other fluid service brake systems which are pressure-applied and spring-released, the service brake apply pressure, which increases with increasing brake demand, may act on a directly proportional pressure regulator valve in the same direction as the biasing spring.

BRAKE CONTROL MODIFICATION

Figure 5:
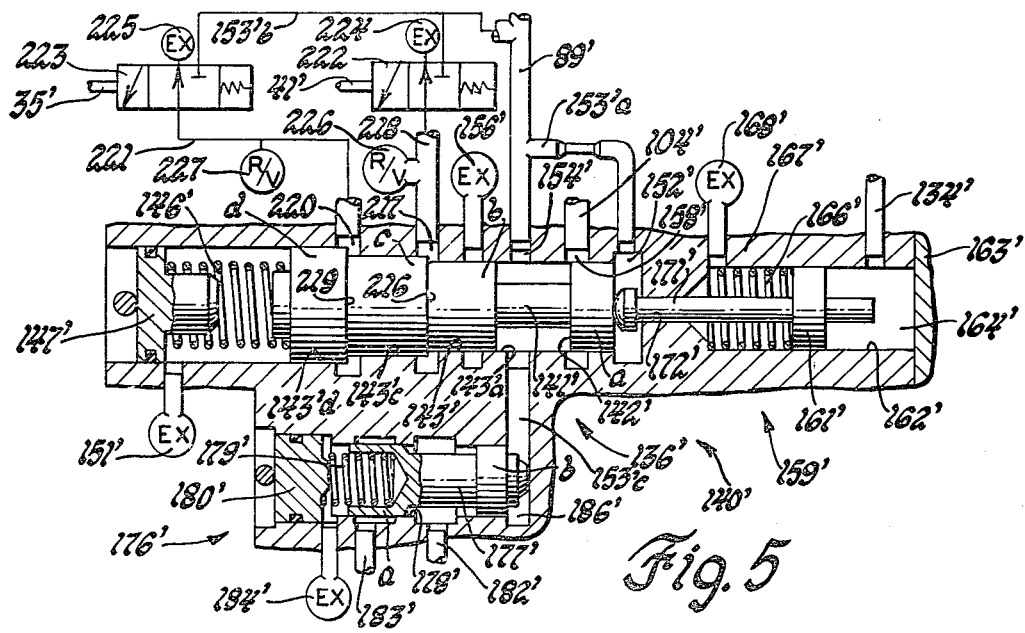
FIG. 5 shows modified internal brake controls.
Figure 6:
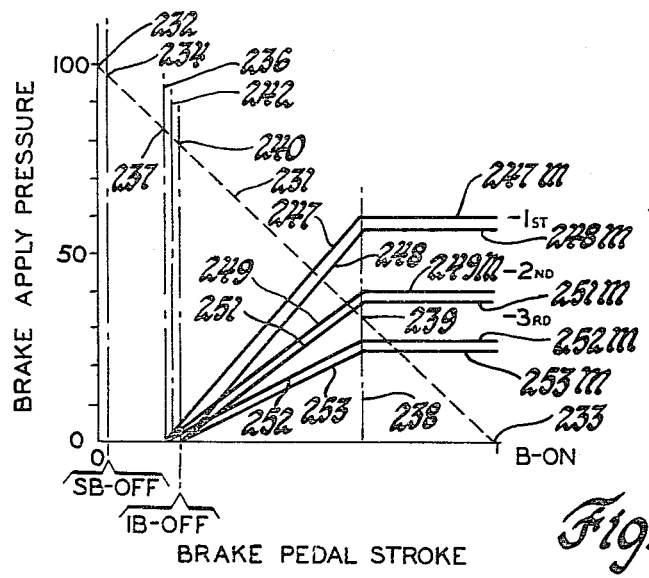
FIG. 6 shows brake apply pressure curves plotted against brake pedal stroke for the FIG. 5 modified controls.
Figure 7:
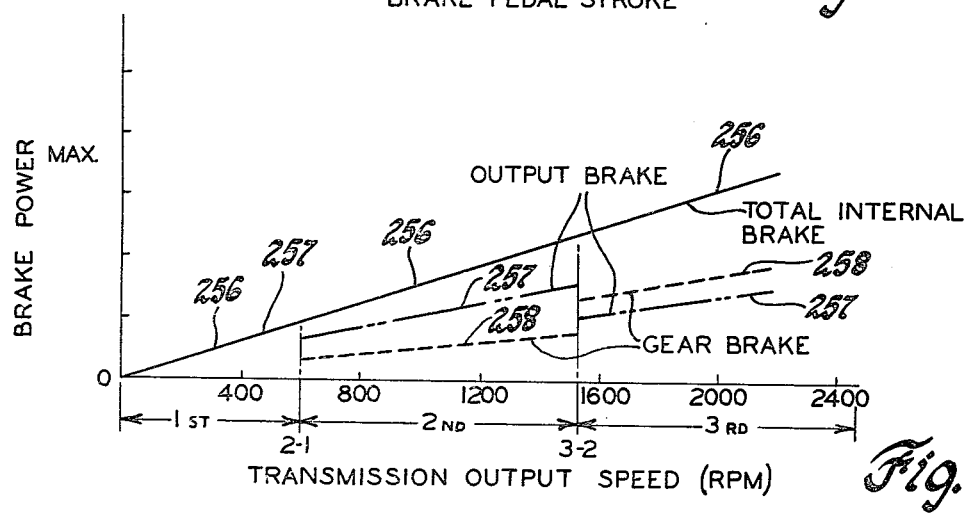
FIG. 7 shows brake power curves plotted against transmission output speed for the FIG. 5 modified controls.

The modified internal brake control 140′ shown in FIG. 5 may be substituted in FIG. 1 for the internal brake control 140 for use with the transmission 9, service brake system 132, and output brake 77 of FIG. 1 to provide the modified brake pressure curves shown in FIG. 6 and the modified braking power curves shown in FIG. 7. The modified internal brake control 140′ of FIG. 5 is similar to internal brake control 140 of FIG. 1, so the same reference numerals (primed) have been used for similar parts and additional reference numerals for added parts. Reference is made to the above description of FIG. 1 for such essentially similar parts having the same function, so the following description can be directed mainly to the modified and added parts and the associated parts of FIG. 5 cooperating to provide the modified operation.

The modified brake pressure regulator valve 136' has a valve element 141' having sequentially lands a and b of equal diameter, and added intermediate land c of larger diameter, and land d of largest diameter. All the lands are located in stepped bore 143' which has a small diameter bore portion 143'a fitting lands 141'a and 141'b; a larger diameter intermediate bore portion 143'c fitting land 141'c; and a largest diameter bore portion 143'd fitting land 141'd. Valve element 141' has between lands 141'a and 141'b a groove 142' which is always connected to brake apply port 154' and, by output brake apply line 89' to output brake motor 81 of FIG. 1. For 2nd ratio control, valve element 141' has between lands 141'b and 141'c a second unbalanced area 216 which is always connected by second bias port 217 at the step between bore portions 143'a and 143'c to a second bias line 218. For 3rd ratio control, valve element 141' has between lands 141'c and 141'd a third unbalanced area 219 which is always connected by a third bias port 220 at the step between bore portions 143'c and 143'd to a third bias line 221. Biasing spring 146' is seated on plug 147' fixed in bore portion 143'd and engages land 141'd to bias valve element 141' in a brake apply pressure-increasing direction, as shown, connecting mainline 104' by mainline port 158' and groove 142' to port 154' and output brake apply line 89'. A restricted branchline 153'a connects brake apply line 89' to pressure chamber 152' to act on the full end area of land 141'a, the first unbalanced area, in a pressure-decreasing direction, connecting brake apply line 89', via port 154' and groove 142', to exhaust port 156'. Brake apply pressure, when selectively supplied to second and third bias lines 218 and 221 to respectively act on second and third unbalanced areas 216 and 219, similarly biases valve element 141' in a pressure-decreasing direction.

Output brake apply line 89' is connected by its branch-line 153'b to second shut-off valve 222 and third shut-off valve 223, which are respectively connected to second bias line 218 and third bias line 221. Second and third shut-off valves 222 and 223 are conventional shut-off valves which are spring-biased to the shut-off and exhaust position shown (FIG. 5), which is the 1st ratio position, and moved by fluid pressure to the connecting position. In the spring-biased shut-off position shown, both second and third shut-off valves 222 and 223 block brake apply branchline 153'b and respectively connect second bias line 218 to exhaust 224 and third bias line 221 to exhaust 225. When gear transmission 12 is selectively placed in 2nd ratio or 3rd ratio by the transmission controls 131 (FIG. 1), fluid at mainline pressure is selectively supplied to second apply line 41' or third apply line 35', and the other of these apply lines is exhausted to selectively engage 2nd or 3rd ratio drives. In 2nd ratio drive, second apply line 41' supplies fluid pressure to second shut-off valve 222 to move second shut-off valve 222 to the connecting position to connect output brake apply pressure from branchline 153'b to second bias line 218 to act on second unbalanced area 216 to bias valve element 141' in a brake pressure-decreasing direction. In 3rd ratio drive, third apply line 35' supplies fluid pressure to third shut-off valve 223 to move third shut-off valve 223 to the connecting position to connect output brake apply pressure from branchline 153'b to third bias line 221 to act on third unbalanced area 219 to bias valve element 141' in a pressure-decreasing direction. The third unbalanced area 219 is larger than the second unbalanced area 216. The output brake pressure in brake apply line 89' is limited to a maximum value by biasing spring 146' of regulator valve 136' in 1st ratio. The second bias line 218 is connected to a second relief regulator valve 226 to limit second bias pressure and brake apply pressure, which are the same in 2nd ratio drive, to a lower intermediate pressure value. The third bias line 221 is connected to third relief regulator valve 227 to limit third bias pressure and brake apply pressure, which are the same in 3rd ratio drive, to a low pressure value. These pressure regulator valves 226 and 227 are conventional relief-type regulator valves which permit pressure control below a predetermined pressure limit value and exhaust excess fluid to regulate or limit the pressure at the predetermined limit value.

Actuator 159' is structurally like the above-described actuator 159 of FIG. 1 and operates in the same manner in response to air signal pressure in brake signal line 134' which varies inversely relative to brake demand to provide, after the opposing bias force of spring 166' is overcome, a bias force, acting through strut 171', on valve element 141' in a pressure-decreasing direction with a force directly proportional to air signal pressure, as reduced by the bias force of spring 166'.

Brake coolant valve 176' is structurally like the above-described brake coolant valve 176 of FIG. 1 and operates in the same manner. Output brake apply line 89' is connected by its branchline 153'c to chamber 186' to actuate brake coolant valve 176' to supply coolant feed line 183'.

BRAKE CONTROL MODIFICATION OPERATION

The operation of the modified brake control 140' of FIG. 5, with the transmission 9, service brake system 132, output brake 77 and gear reaction brake system 98 of FIG. 1 is basically the same as described above for FIG. 1; therefore the modified operating characteristics, for modifying brake apply pressure in response to ratio change to provide constant total brake torque and continuously increasing total brake power with increasing speed, are now described.

The brake pedal 133, as described above and shown in FIG. 1, is moved through the same stroke positions to provide the same brake pressure signal (Curve 231, FIGS. 3 and 6) to operate air brake system 132 (FIG. 1) in the same manner. This brake pressure signal is connected by brake signal line 134' to actuator 159' to operate brake pressure regulator valve 136' (FIG. 5) in the same manner with similar coordination in 1st ratio drive, but to reduce the gross and net brake apply pressures with increasing transmission speed ratio for equal total internal brake torque in all ratio drives.

In 1st ratio drive, as second and third apply lines 41' and 35' (FIG. 5) are exhausted by transmission controls 131 (FIG. 1), so second and third shut-off valves 222 and 223 are in the spring-biased shut-off exhaust position shown in FIG. 5 connecting second and third bias lines 218 and 221 to exhausts 224 and 225. The second and third unbalanced areas 216 and 219 do not provide a bias force on regulator valve element 141'. Thus, regulator valve 136' (FIG. 5) functions like regulator valve 136 (FIG. 1), beginning at the initial gross brake apply pressure stroke position (236) of brake pedal 133 to provide 1st gross brake pressure (Curve 247, FIG. 6), increasing from zero to a maximum pressure at high brake apply stroke position (238) of brake pedal 133, and continuing at the maximum pressure (247M) with brake pedal movement to both brakes full-on stroke position (B-ON). The 1st gross brake apply pressure, reduced by the pressure required to overcome the retraction springs 84 of output brake 77, is the first net brake apply pressure (Curve 248, FIG. 6) which, during pedal 133 movement from internal brake-off position (IB-OFF) to a higher brake apply stroke position (238), increases from zero to a maximum value (e.g., 57 psi) and remains at the maximum value (248M), with further brake pedal movement, to the brakes full-on stroke position (B-ON).

In 2nd ratio drive, third apply line 35' (FIG. 5) remains exhausted, and 2nd ratio pressure is supplied by second apply line 41' to second shut-off valve 222 to connect brake apply line 89', via branchline 153'b, to second bias line 218. Thus gross brake apply pressure acts on small second unbalanced area 216 to provide second gross brake apply pressure (Curve 249) at proportionally lower values than first gross brake apply pressure. Second relief valve 226 limits the maximum second gross brake apply pressure (249M) to a lower value than maximum first gross brake apply pressure (247M). The second gross brake apply pressure (Curve 249, FIG. 6) increases at a rate lower than first gross brake apply pressure, from zero to a lower maximum value (249M), e.g., 38 psi, with brake pedal 133 movement from the initial gross brake pressure stroke position (236) to the higher brake apply stroke position (238), and continues at the lower maximum value (249M) to brakes full-on position (B-ON) of brake pedal 133. The second net brake apply pressure (Curve 251) is similar to, and a constant pressure lower than second gross brake apply pressure (Curve 249), and increases from zero to a lower maximum value (251M) as the brake pedal 133 moves from internal brakes-off position (IB-OFF) to higher brake apply stroke position (238). The lower maximum value (251M) remains constant as brake pedal 133 is moved to the brakes full-on position (B-ON).

In 3rd ratio drive, 2nd ratio line 41' (FIG. 5) is exhausted closing second shut-off valve 222 and exhausting second bias line 218, and fluid pressure is supplied to 3rd ratio line 35' to open third shut-off valve 223 to connect output brake apply line 89', via branchline 153'b, to third bias line 221 to act on the larger third unbalanced area 219. The regulator valve 136' regulates third gross brake apply pressure (Curve 252) to rise at a lower rate to a lower maximum value (252M), e.g., 25 psi, as limited by third relief valve 227, than second gross brake apply pressure (Curve 249), between the same positions of brake pedal 133 (FIG. 1). The third net brake apply pressure (Curve 253) is similarly lower than the third gross brake apply pressure (Curve 252), and rises at a lower rate to a lower maximum value (253M) and remains constant, as compared to second net brake apply pressure (Curve 251) between the same positions of brake pedal 133, from internal brake-off position (IB-OFF) through higher brake apply stroke position (238) to brakes full-on position (B-ON).

The brake torque on output shaft 71 (FIG. 1) provided by output brake 77 is proportional to the net brake apply pressure and increases with brake demand from internal brake-off position (IB-OFF) to higher brake apply stroke position (238, FIG. 6). The rate of brake torque increase and maximum torque by output brake 77 decreases in steps with increasing speed ratio shifts proportional to the step-decrease of the rate of increase and the maximum pressure of first, second, and third net brake apply pressures (Curves 248, 251, 253, respectively).

At the maximum net brake apply pressure in each ratio drive, the maximum total internal brake torque is the same in each ratio, so the total internal brake power (Curve 256, FIG. 7) is a straight-line curve increasing with speed. At each upshift, the net brake apply pressure is reduced to compensate for the additional gear brake torque, so the total internal brake torque is the same predetermined value in all ratio drives. In 1st ratio drive, the maximum net brake apply pressure (248M, FIG. 6) is high to apply output brake 77 with the predetermined value of maximum output brake torque, which is the total maximum internal brake torque, as there is no gear brake torque in 1st ratio drive. In 1st ratio drive, the constant maximum output brake torque equals the total internal brake torque to provide the same maximum output brake power (Curve 257) and total internal brake power (Curve 256) increasing with speed.

In 2nd ratio drive, the maximum net brake apply pressure (251M, FIG. 6) is lower to apply output brake 77 with a lower value of maximum output brake torque and to apply the gear reaction brake system 98 for low maximum gear brake torque, so the total maximum internal brake torque has the same predetermined value. In 2nd ratio drive, the lower maximum output brake torque provides lower maximum output brake power (Curve 257, FIG. 7), and low maximum gear brake torque provides low maximum gear brake power (Curve 258, FIG. 7), so their sum is the maximum total internal brake power (Curve 256).

In 3rd ratio drive, the maximum net brake apply pressure (253M, FIG. 6) is further reduced to apply output brake 77 with a further reduced value of maximum output brake torque and to apply the gear reaction brake system 98 for a higher value of maximum gear brake torque due to the 2–3 ratio change, so the total maximum internal brake torque has the same predetermined value. In 3rd ratio drive, the maximum output brake power (Curve 257, FIG. 7) is similarly further reduced and the maximum gear brake power (Curve 258) is increased, and their sum is the maximum total internal brake power (Curve 256). At lower brake demand values providing lower net brake apply pressure, the torque and power in each ratio drive is proportionally reduced. Since total brake torque is equal in all ratios, the total internal brake power (Curve 256) is a continuous or straight-line curve and will match vehicle brake power requirements at a particular grade throughout the vehicle speed range.

It will be appreciated that further modifications of the invention may be made.

I claim:

1. In a transmission: an input; an output; a multiratio gear unit having gearing having first and second drive establishing means selectively operated for friction engagement to respectively provide first and second ratio drives between said input and said output and simultaneously operated for friction engagement to provide gear braking of said output; friction brake means operatively connected to said output selectively operable to engage and to disengage said friction brake means; drive control means to selectively establish said first and second drive establishing means to respectively provide said first and second ratio drives; and brake control means in brake off position operable to disengage said friction brake means and to permit said drive control means to selectively establish said first and second drive establishing means, and in brake on position operable in all said ratio drives to engage said friction brake means to provide friction braking, and in one ratio drive established by disengagement of one of said drive establishing means and engagement of another of said drive establishing means to engage said one of said drive establishing means to, in concert with the established another of said drive establishing means, provide gear braking.

2. The invention defined in claim 1, and a mechanical operator; said friction brake means being mechanically connected by said mechanical operator to said one of said drive establishing means to simultaneously engage said friction brake means and said one of said drive establishing means in said one ratio drive for simultaneous friction braking and gear reaction braking.

3. In a transmission: an input; an output; a multiratio gear unit having gearing having first and second drive establishing means selectively operated for friction engagement to respectively provide first and second ratio drives between said input and said output and simultaneously operated for friction engagement to provide gear braking of said output; friction brake means operatively connected to said output selectively operable to engage and to disengage said friction brake means; drive control means to selectively establish said first and second drive establishing means to respectively provide said first and second ratio drives; and brake control means in brake off position operable to disengage said friction brake means and to permit said drive control means to selectively establish said first and second drive establishing means, and in brake on position operable in said first ratio drive to engage said friction brake means to provide friction braking and to continue operation of said first drive establishing means to provide said first ratio drive, and in said second ratio drive operable to engage said friction brake means to provide friction braking and to engage said first drive establishing means to, in concert with the established second drive establishing means, provide gear braking.

4. The invention defined in claim 3, and said brake control means engaging said friction brake means with the same force in said first and second ratio drives, and said gear braking providing additional gear braking torque in said second ratio drive.

5. The invention defined in claim 3, and said brake control means engaging said friction brake means with high force in said first ratio drive and with reduced force in said second ratio drive so the sum of the torque provided by said friction brake means and said gear braking in said second ratio drive is the same as the torque provided by said friction brake means in said first ratio drive.

6. The invention defined in claim 3, and vehicle service brakes; service brake operating means connected to said vehicle service brakes to increase the torque of said vehicle service brakes in response to increasing brake demand, and connected to said brake control means to increase the torque of said friction brake means from zero torque at an intermediate brake demand to high torque at high brake demand.

7. In a transmission: an input; an output; a multiratio gear unit having planetary gearing having first and second drive establishing means selectively operated for friction engagement to respectively provide first and second ratio drives between said input and said output and simultaneously operated for friction engagement to provide planetary reaction braking of said output; friction brake means operatively connected to said output selectively operable to engage and to disengage said friction brake means; drive control means to selectively engage said first and second drive establishing means to respectively provide said first and second ratio drives; operating means connected between said first drive establishing means and said friction brake means operative in response to engagement of said friction brake means to engage and continue engagement of said first drive establishing means, and operative in response to engagement of said first drive establishing means by said drive control means to permit engagement and disengagement of said friction brake means; and brake control means in brake off position operable to disengage said friction brake means and to permit said drive control means to selectively engage said first and second drive establishing means, and in brake on position operable in said first ratio drive on said friction brake means to engage said friction brake means and continue engagement of said first drive establishing means to provide friction braking and said first ratio drive, and in said second ratio drive operable on said friction brake means to engage said friction brake means, and said friction brake means acting on said operating means to engage said first drive establishing means to provide friction braking and, in concert with the established second drive establishing means, to provide planetary reaction braking.

8. The invention defined in claim 7, and said operating means having a common backing member located between said first drive establishing means and said friction brake means, mounted for movement in response to engagement of said friction brake means to engage said first drive establishing means, and stopped on movement in the opposite direction in response to engagement of said first drive establishing means so that said friction brake means is free to engage and disengage in response to control by said brake control means.

9. In a transmission: an input; an output; a multiratio gear unit having planetary gearing with a first ratio reaction member and a second ratio reaction member selectively held to respectively provide first and second ratio drives and simultaneously held to provide planetary reaction braking; a housing; first ratio drive establishing means having first friction means operatively connected between said first ratio reaction member and said housing, and first actuator means selectively operable to engage said first friction means to hold said first ratio reaction member to establish said first ratio drive; second ratio drive establishing means having second friction means operatively connected between said second ratio reaction member and said housing, and second actuator means selectively operable to engage said second friction means to hold said second ratio reaction member to establish said second ratio drive; output brake means having brake friction means operatively connected between said output and said housing, and brake actuator means selectively operable to engage said brake friction means and said first friction means and to disengage said brake friction means and permit control of said first friction means by said first actuator means; drive control means to selectively operate said first and second actuator means to respectively engage said first and second friction means for said first and second ratio drives and to respectively disengage said second and first actuator means; and brake control means in brake-off position operable to disengage said brake actuator means and said brake friction means and to permit said drive control means to selectively control said first and second actuator means, and in brake-on position operable in said first ratio drive on said brake actuator means to engage said brake friction means and continue engagement of said first friction means to provide friction braking and first ratio drive, and in said second ratio drive operable on said brake actuator means to engage said brake friction means and said first friction means to provide friction braking and, in concert with the engaged second friction means, to provide planetary reaction braking.

10. In a transmission: an input; an output; multiratio gear means having low ratio friction means and higher ratio friction means selectively engaged to respectively provide a low speed ratio drive and higher speed ratio drive between said input and said output, and said low ratio friction means and said higher ratio friction means simultaneously engaged for gear reaction braking of said output; friction brake means connected to said output to provide friction braking of said output; ratio control means connected to said multiratio gear means to selectively engage said low ratio and said higher ratio friction means to respectively provide said low and higher speed ratio drives; brake control means operatively connected to said friction brake means to engage and disengage said friction brake means; and operating means connecting said friction brake means and said low ratio friction means and being operative when said friction brake means is disengaged to permit selective engagement of said low and and higher ratio friction means and operative in response to engagement of said friction brake means when said low ratio friction means is engaged by said ratio control means to provide output friction braking in said low speed ratio drive, and when said low ratio friction means is disengaged and said higher ratio friction means is engaged by said ratio control means to engage said low ratio friction means for simultaneous engagement of said low and said higher ratio friction means for gear reaction braking and friction braking of said output.

11. The invention defined in claim 10, and said multiratio gear means being planetary gearing having a reaction member braked to provide said low speed ratio drive, and said low ratio friction means being a reaction brake.

12. The invention defined in claim 10, and a housing, said operating means having a stop on said housing and a common backing device for said friction brake means and said low ratio friction means mounted in said housing for movement to engage said stop and away from said stop; said ratio control means having a low ratio actuator movable from disengaged position to engaged position to engage said low ratio friction means against said common backing device engaging said stop to permit engaging and disengaging of said friction means by said brake control means; and said brake control means having a brake actuator engaging said friction brake means against said common backing device and, when said low ratio friction means is disengaged, moving said common backing device to engage said low ratio friction means against said low ratio actuator in said disengaged position.

13. The invention defined in claim 10, and a transmission lubrication system operative to supply lubricant to said multiratio gear means and said low and higher ratio friction means and said friction brake means during operation; and a brake lubrication system operative in response to said brake control means to supply additional lubricant to said low ratio friction means and said friction brake means just prior to and during engagement of said friction brake means by said brake control means.

14. The invention defined in claim 10, and a housing having a rear wall; said friction brake means having an inner drum mounted for rotation with said output and having a rear end adjacent said rear wall, and said brake lubrication system having a plurality of axial passages in said inner drum extending from an inlet adjacent said rear end to said friction brake means and said low ratio friction means; a supply passage in said rear wall and transfer passage means connected between said supply passage in said rear wall and said inlet of said axial passages in said inner drum to provide a sealed low volume passage for continuous lubricant supply from said supply passage continuously to all of said axial passages without delay.

15. In a transmission: a housing, input means; output means; planetary gear means in said housing between said input means and said output means operative to connect said input means and said output means in low and high speed ratio drives; an output drum rotatably disposed in said housing and drive connected to said output means; a reaction drum rotatably disposed in said housing axially adjacent said output drum and drive connected to said planetary gear means; a plurality of reaction brake discs disposed alternately on said housing and on said reaction drum for axial movement; a plurality of output brake discs disposed alternately on said housing and on said output drum for axial movement; a backing plate disposed on said housing between said reaction brake discs and said output brake discs for axial movement; stop means on said housing operative to limit axial movement of said backing plate toward said output brake discs; a fluid pressure operated reaction actuator on said housing operative to shift said reaction brake discs and said backing plate axially toward said output brake discs and against said stop means thereby to brake said reaction drum against rotation; said planetary gear means being in said low speed ratio drive with said reaction drum braked, and a fluid pressure operated output brake actuator on said housing operative to shift said output brake discs and said backing plate and said reaction brake discs axially toward said reaction actuator thereby to capture said reaction brake discs and said output brake discs for braking said reaction drum and said output drum against rotation.

16. The invention defined in claim 15, and high ratio fluid operated means associated with said planetary gear means for establishing said high speed ratio drive when said reaction drum is unbraked; ratio control means for selectively supplying fluid pressure to said reaction actuator and said high ratio fluid-operated means to respectively establish said low and high speed ratio drive; and brake control means for supplying a fluid pressure proportional to brake demand to said output brake actuator, said output brake actuator being operative in both said low speed and said high speed ratio drives to engage said output brake discs and being operative in said high speed ratio drive to engage reaction brake discs in addition to the engaged high ratio fluid-operated means to provide additional gear reaction braking.

17. The invention defined in claim 16, and said brake control means supplying fluid pressure in the same proportion to brake demand up to the same maximum value in both said low and high speed ratio drives, so that total brake torque in said high speed ratio drive is increased by said additional gear reaction braking.

18. The invention defined in claim 16, and said brake control means supplying fluid pressure having a high proportion to brake demand to a high maximum value in said low speed ratio drive to provide a predetermined brake torque, and supplying fluid pressure having a lower proportion to brake demand to a lower maximum value so that total brake torque is the same in both said low and high speed ratio drives.

19. The invention defined in claim 16, and a retraction spring operative on said output brake actuator to disengage said output brake discs; brake cooling means operative in response to fluid pressure supplied by said brake control means to said output brake actuator having a value insufficient to overcome said retraction spring to supply lubricant to said output brake discs.

* * * * *